(12) United States Patent
Reed et al.

(10) Patent No.: US 12,095,641 B2
(45) Date of Patent: Sep. 17, 2024

(54) LEVELING HSM SERVICE WITH NETWORK TRAFFIC CONTROL

(71) Applicant: THALES DIS CPL USA, INC., Austin, TX (US)

(72) Inventors: Wayne Reed, Kemptville (CA); Ranga Anumulapally, Pembroke Pines, FL (US); Marc André Boillot, Plantation, FL (US)

(73) Assignee: THALES DIS CPL USA, INC., Austin, TX (US)

( * ) Notice: Subject to any disclaimer, the term of this patent is extended or adjusted under 35 U.S.C. 154(b) by 0 days.

(21) Appl. No.: 18/103,568

(22) Filed: Jan. 31, 2023

(65) Prior Publication Data
US 2024/0259287 A1    Aug. 1, 2024

(51) Int. Cl.
*H04L 43/0888* (2022.01)
*H04L 43/062* (2022.01)
*H04L 47/22* (2022.01)
*H04L 47/62* (2022.01)

(52) U.S. Cl.
CPC ........ *H04L 43/0888* (2013.01); *H04L 43/062* (2013.01); *H04L 47/22* (2013.01); *H04L 47/621* (2013.01)

(58) Field of Classification Search
None
See application file for complete search history.

(56) References Cited

U.S. PATENT DOCUMENTS

| | | |
|---|---|---|
| 7,363,353 B2 | 4/2008 | Ganesan et al. |
| 7,644,150 B1 | 1/2010 | Nucci et al. |
| 8,156,499 B2 | 4/2012 | Foulger et al. |
| 8,161,547 B1 | 4/2012 | Jennings et al. |
| 8,675,875 B2 | 3/2014 | Yellepeddy et al. |
| 9,596,184 B1 | 3/2017 | Cai et al. |

(Continued)

FOREIGN PATENT DOCUMENTS

| | | |
|---|---|---|
| CN | 101556583 | 10/2009 |
| CN | 102404226 A | 4/2012 |

OTHER PUBLICATIONS

International Search Report (PCT/ISA/2010) & Written Opinion (PCT/ISA/237) mailed by ISA/EP on May 24, 2024 for corresponding International Application pursuant to the PCT, N°PCT/US2024/013711 (15 pages).

*Primary Examiner* — Angela Nguyen

(57) ABSTRACT

Provided is a method for a Hardware Security Module (HSM) appliance to provide cryptographic services to multiple clients via cryptographic service requests and responses transmitted over a secure communication channel there between. The method comprises the steps of providing a traffic control feature for communications over said secure communication channel by way of a Linux Kernel, and leveling cryptographic service and balancing a workload of cryptographic transactions on the HSM appliance for the multiple clients submitting said requests and receiving said responses by way of a Traffic Control Agent (TCA), thereby distributing a fair, proportional share of resources on the HSM appliance needed for servicing the cryptographic services to multiple clients irrespective of thread count per client. Other embodiments disclosed, including a dynamic intelligent TCA.

20 Claims, 8 Drawing Sheets

(56) References Cited

U.S. PATENT DOCUMENTS

| | | | |
|---|---|---|---|
| 9,697,382 B2 | 7/2017 | Korkishko et al. | |
| 11,792,301 B1 * | 10/2023 | Du | H04L 67/1001 |
| | | | 709/226 |
| 2011/0131407 A1 | 6/2011 | Relyea | |
| 2012/0166483 A1 * | 6/2012 | Choudhary | G06F 16/2471 |
| | | | 707/E17.014 |
| 2012/0331479 A1 * | 12/2012 | Takagi | G06F 9/505 |
| | | | 718/105 |
| 2015/0358161 A1 | 12/2015 | Kancharla et al. | |
| 2015/0358313 A1 | 12/2015 | Hussain et al. | |
| 2016/0028551 A1 | 1/2016 | Hussain et al. | |
| 2020/0097682 A1 | 3/2020 | Couillard et al. | |
| 2021/0051002 A1 | 2/2021 | Cheng et al. | |

\* cited by examiner

0: Bash 1: Clients

Multitoken −m rsasigver −ses −f −p 16 −k 2048
0x100
Initializing Library .... Done                                    261
Constructing thread objects.
Logging in to tokens ....
    slot 0.... Serial Number 125583923
Test threads created successfully
    RSA sign 2058-bit 0, 0, 0,999   | operations/second | elapsed
              | total/average     | time (sec)
-------------------------------------------
1.0  1.0      | 962    1231       | 0.8   1.0
0.8  1.0      | 964 ⇧  963        | 1.2    930

Multitoken −m rsasigver −ses −f −p 16 −k 2048
0x100
Initializing Library .... Done                                    262
Constructing thread objects.
Logging in to tokens ....
    slot 0.... Serial Number 125583923
Test threads created successfully
    RSA sign 2058-bit 0, 0, 0,999   | operations/second | elapsed
              | total/average     | time (sec)
-------------------------------------------
19.2  19.2    | 1917   1656       | 19.2  19.2
19.0  19.0    | 1916 ⇧ 1918       |        960

Multitoken −m rsasigver −ses −f −p 16 −k 2048
0x100
Initializing Library .... Done                                    263
Constructing thread objects.
Logging in to tokens ....
    slot 0.... Serial Number 125583923
Test threads created successfully
    RSA sign 2058-bit 0, 0, 0,999   | operations/second | elapsed
              | total/average     | time (sec)
-------------------------------------------
28.8  28.8    | 2873    2737      | 28.8  28.6
28.8  28.6    | 2873 ⇧  2874      |       9605

Multitoken −m rsasigver −ses −f −p 16 −k 2048
0x100
Initializing Library .... Done                                    271
Constructing thread objects.
Logging in to tokens ....
    slot 0.... Serial Number 125583923
Test threads created successfully
    RSA sign 2058-bit 0, 0, 0,999   | operations/second | elapsed
              | total/average     | time (sec)
-------------------------------------------
1.2  1.2      | 1164    1102      | 1.2   1.2
1.0  1.2      | 1168 ⇧  1162      |        770

Multitoken −m rsasigver −ses −f −p 16 −k 2048
0x100
Initializing Library .... Done                                    272
Constructing thread objects.
Logging in to tokens ....
    slot 0.... Serial Number 125583923
Test threads created successfully
    RSA sign 2058-bit 0, 0, 0,999   | operations/second | elapsed
              | total/average     | time (sec)
-------------------------------------------
13.4  13.4    | 1345    1314      | 13.2  13.2
13.4  13.2    | 1345 ⇧  1336      |        950

Multitoken −m rsasigver −ses −f −p 16 −k 2048
0x100
Initializing Library .... Done                                    273
Constructing thread objects.
Logging in to tokens ....
    slot 0.... Serial Number 125583923
Test threads created successfully
    RSA sign 2058-bit 0, 0, 0,999   | operations/second | elapsed
              | total/average     | time (sec)
-------------------------------------------
13.4  13.4    | 1346    1316      | 13.2  13.2
13.4  13.2    | 1340 ⇧  1341      |        955

FIG. 2B

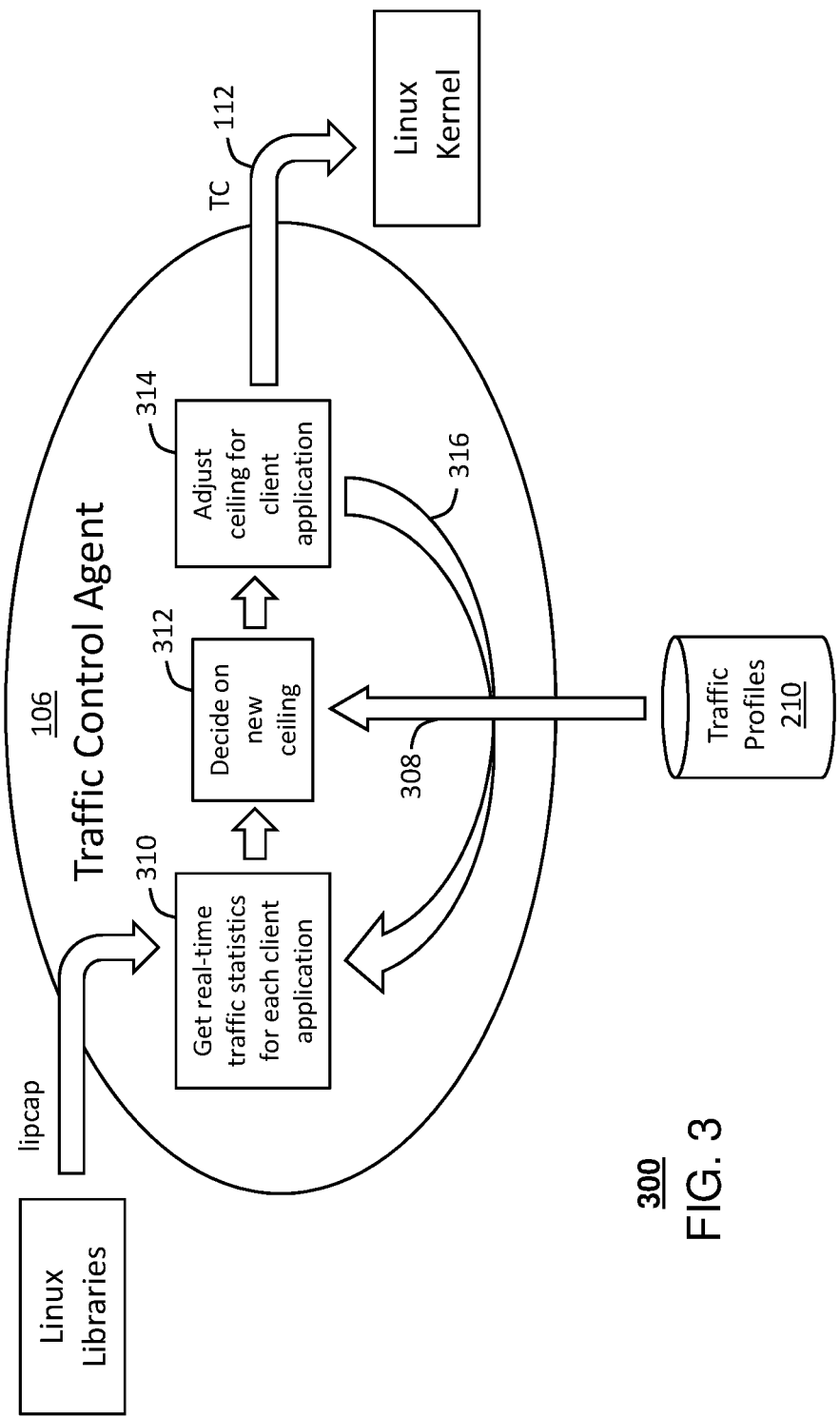

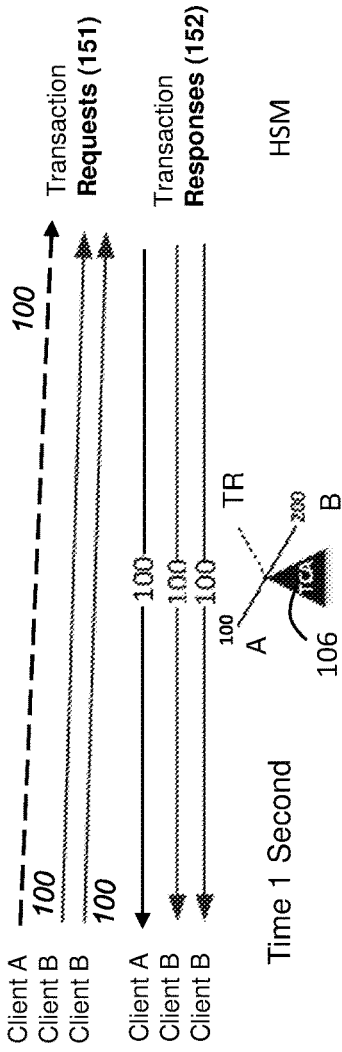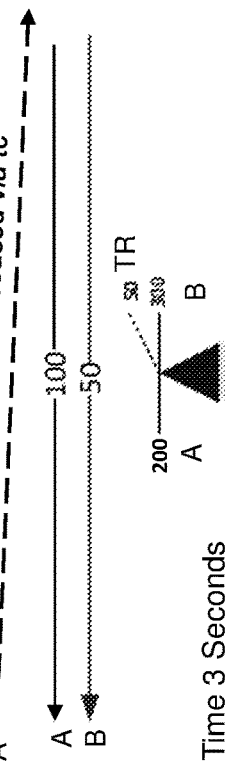

LEVELING HSM SERVICE WITH NETWORK TRAFFIC CONTROL

TECHNICAL FIELD

The present embodiments relates generally to Hardware Security Modules (HSM), and more particularly, to network traffic control and services for managing cryptographic transaction workloads on HSMs.

BACKGROUND

Hardware Security Modules (HSMs) are dedicated systems that physically and logically secure cryptographic keys and cryptographic processing. The purpose of an HSM is to protect sensitive data from being stolen by providing a highly secure operation structure. HSMs are fully contained and complete solutions for cryptographic processing, key generation, and key storage. One instantiation is as purpose-built appliances that automatically include the hardware, firmware and software necessary for these functions in an integrated package.

Cloud and as-a-service HSM deployments create new challenges for service providers. A network HSM is able to serve hundreds of clients simultaneously. Clients request cryptographic services to which the HSM responds. However, an HSM architecture is intrinsically designed to maximize performance of the appliance as a whole; for example, with respect to total request/response throughput across all connected clients. Consequently, a client that submits hundreds or thousands of HSM transaction requests, usually measured in terms of cryptographic operations per second, can overwhelm, or block the HSM of its processing resources needed to service other clients, thereby drowning out other clients that make requests of the HSM less frequently. This scenario is referred to as the "noisy neighbor", for instance, when a larger share of HSM resources is consumed by one demanding client with many requests in comparison to other quieter clients with fewer requests. A demanding client may also be considered noisy.

Another concern with limited HSM resources is that requests for cryptographic services is generally processed on a first come first serve basis. This further impedes the ability of as-a-service providers to quantitatively or qualitatively guarantee a certain level of service. So, even a lot of small client requests can lead to an HSM appliance being unable to offer the critical client the level of service required. Some as-a-service providers have critical applications in their infrastructure that demand a certain level of service. A smaller client with few requests may receive even less than the number of transactions per second than the service provider has guaranteed.

One means to alleviate these conditions is to over-engineer or increase the HSM capacity, but this is an expensive approach. And, although customers could implement general traffic throttling on the client side, it is not so effective across multiple clients for the noisy neighbor problem. Pinning Central Processing Units (CPUs) to client applications is another means to create a quality of service. However, this solution must be inherent in the architecture from inception. Retrofitting quality of service into a network appliance via other means is equally costly and complex.

SUMMARY

What is needed is an effective and relatively low-cost approach to overcome the noisy neighbor problem, and to enable a guaranteed level of service for critical applications. Herein contemplated, a means of traffic control is applied to the noisy neighbor problem to guarantee that clients will receive the number of transactions per second per their service agreement terms and conditions.

In some embodiments, a Hardware Security Module (HSM) appliance provides cryptographic services to multiple clients via cryptographic service requests and responses transmitted over a secure communication channel there between. The HSM appliance comprises a Linux Kernel providing a traffic control feature for communications over said secure communication channel, and a Traffic Control Agent (TCA) to level cryptographic service and balance a workload of cryptographic transactions on the HSM appliance for the multiple clients submitting said requests and receiving said responses. This provides for distributing a fair, proportional share of resources on the HSM appliance needed for servicing the cryptographic services to multiple clients irrespective of the demands of an individual client (e.g., large number of threads).

In some embodiments, the TCA collects traffic throughput metrics per client application over unit time related to the cryptographic services, reports said metrics to an administrator by way of an administrative shell used to set a desired throughput profile per client application, and shapes traffic returned to client applications responsive to the desired throughput profile set by an administrator. It shapes said traffic by way of traffic control that filters internet protocol packets destined to an IP address and port associated with the secure communication channel, configures a kernel packet scheduler in a network stack managed by the Linux Kernel associated with traffic over the secure communication channel, and applies rules to said traffic on the secure communication channel associated with the cryptographic service requests and responses based on any number of queuing techniques such as Stochastic Fair Queuing (SFQ) and Hierarchical Token Buckets (HTB) of said traffic control feature.

In some embodiments, the traffic control agent (TCA) leverages stochastic fair queuing (STF) and Hierarchical Token Bucket (HTB) of the traffic control feature. By lowering a ceil value of the ceiling parameter, it reduces responses to client application, thereby reducing the volume of subsequent requests to the HSM appliance by the client application. The TCA can specifically restrict traffic returned to the identified noisy clients that request more cryptographic transactions over an interval than a determined threshold with respect to other clients. The TCA tracks a number of cryptographic transactions for each of the multiple clients and establishes where a Traffic Restriction (TR) is set for equitable apportioning of HSM resources for servicing the requests. By way of the Traffic Restriction (TR), the identified noisy clients only get responses to requests issued previously and are unable to issue new requests thereby reducing bandwidth to the HSM and cryptographic service workload thereon. The TCA adjusts a ceiling parameter in a continuous feedback manner that selectively restricts traffic to identified noisy clients while obtaining real-time traffic statistics from said multiple clients.

In some embodiments, a method is provided for a Hardware Security Module (HSM) appliance to provide cryptographic services to multiple clients via cryptographic service requests and responses transmitted over a secure communication channel there between. The method comprises the steps of providing a traffic control feature for communications over said secure communication channel by way of a Linux Kernel, and leveling cryptographic service and balancing a workload of cryptographic transactions on the HSM appliance for the multiple clients submitting said requests and receiving said responses by way of a Traffic Control Agent (TCA), thereby distributing a fair, proportional share of resources on the HSM appliance needed for servicing the cryptographic services to multiple clients irrespective of thread count per client.

This includes collecting traffic throughput metrics per client application over unit time related to the cryptographic services, reporting said metrics to an administrator by way of an administrative shell used to set a desired throughput profile per client application, and shaping traffic returned to client applications responsive to the desired throughput profile set by an administrator. The method includes filtering internet protocol packets arriving at an IP address and port associated with the secure communication channel, configuring a kernel packet scheduler in a network stack managed by the Linux Kernel associated with traffic over the secure communication channel, and applying rules to said traffic on the secure communication channel associated with the cryptographic service requests and responses based on Stochastic Fair Queuing (SFQ) and Hierarchical Token Buckets (HTB) of said traffic control feature.

The step of shaping traffic is by way of the rules, and includes tracking a number of cryptographic transactions for each of the multiple clients and establishing a Traffic Restriction (TR) for equitable apportioning of HSM resources for servicing the requests. This includes lowering a ceiling value to restrict traffic returned to the identified noisy clients that request more cryptographic transactions over an interval than a determined threshold with respect to other clients. The identified noisy clients only get responses to requests issued previously and are unable to issue new requests thereby reducing bandwidth to the HSM and cryptographic service workload thereon.

In other embodiment an intelligent dynamic TCA, and method thereof, is provided. It creates a traffic profile responsive to collecting, reporting, and shaping. In this configuration, the TCA further automatically interprets the traffic profile created to see what resources various cryptographic operations consume. It then dynamically adjusts traffic in a feedback loop with less administrative involvement.

BRIEF DESCRIPTION OF THE DRAWINGS

The accompanying drawings, which are incorporated in and constitute a part of this description, illustrate embodiments consistent with the embodiments and, together with the description, serve to explain the principles of the embodiments.

FIG. 2B depicts a client cryptographic tool for setting traffic profiles of an HSM in accordance with an embodiment;

FIG. 3 illustrates a method and workflow for shaping traffic to target profiles of an HSM in accordance with an embodiment;

FIGS. 4A, 4B & 4C illustrate exemplary 1, 2, and 3 second time periods for HSM resource balancing via traffic control in accordance with one embodiment;

Figure 1:
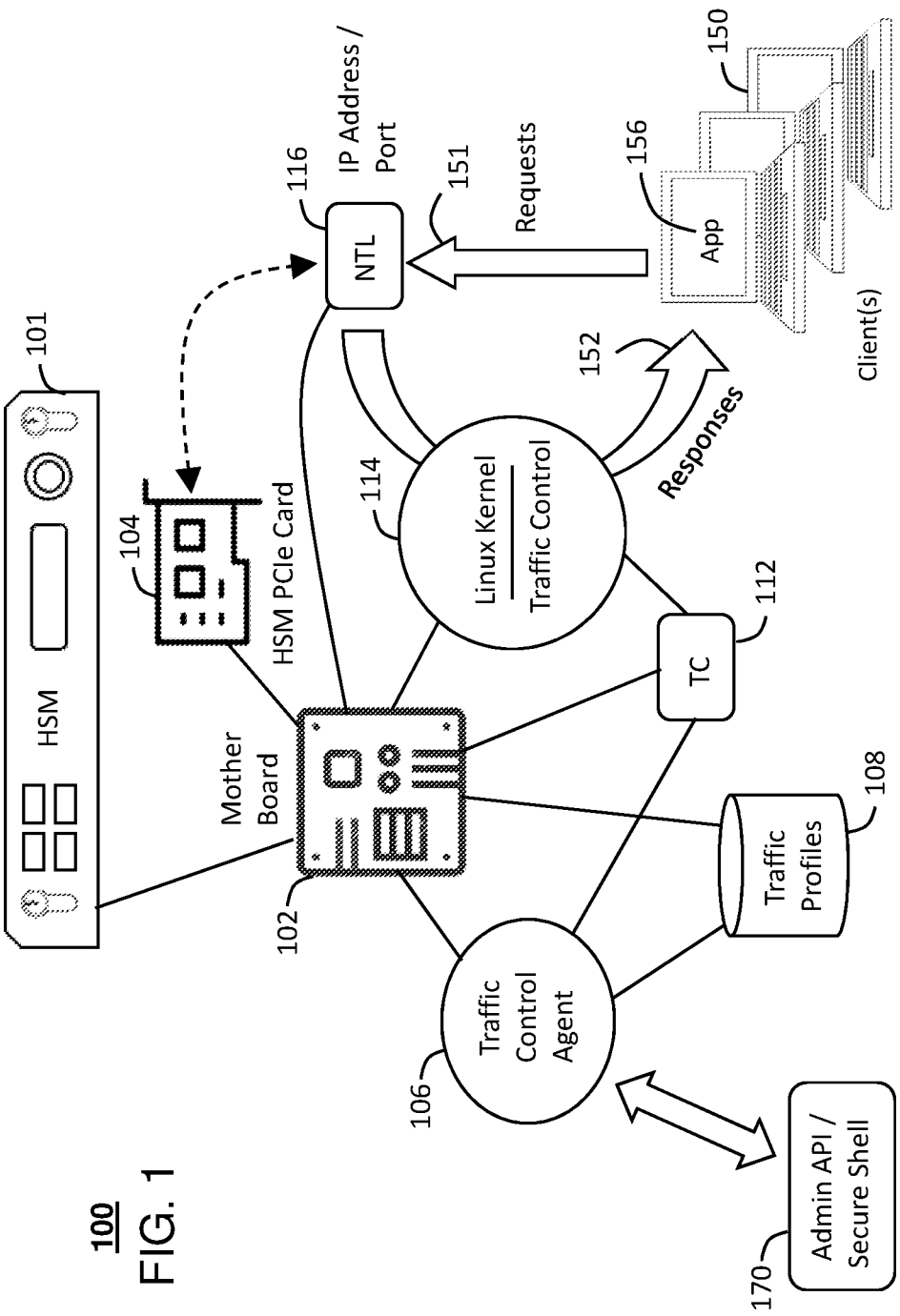
FIG. 1 is a diagrammatic representation of a Hardware Security Module (HSM) with in-place traffic controls for leveling HSM services in accordance with one embodiment.

Specific embodiments have been shown by way of examples in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the embodiments. Instead, they are merely examples of apparatuses and methods consistent with aspects related to the embodiments as recited in the appended claims.

In the context of the present description, a Hardware Security Module (HSM) is a hardened, tamper-resistant device that secure cryptographic processes by generating, protecting, and managing keys used for encrypting and decrypting data and creating digital signatures and certificates. An HSM "Appliance" is a physical computing system that, like other HSMs, among other capabilities, safeguards and manages digital keys, performs encryption and decryption functions for digital signatures, and provides for strong authentication and other cryptographic functions. As a security hardened unit, an HSM Appliance records tamper evidence, such as visible signs of tampering or logging and alerting, and provides for tamper responsiveness such as deleting keys upon tamper detection. An HSM Appliance has added capabilities to connect to an IP network, asynchronously generate events, run a web server, and any other processes that can run on a general purpose motherboard.

In some embodiments an HSM Appliance includes therein a PCIe card as an independent tamper protected module with its own security scope and certification. The HSM Appliance may be designed or configured as either, or both, a general purpose HSM or a payments HSM. A "cloud HSM" provides same functionality as HSM Appliances with the benefits of a cloud service deployment, without the need to host and maintain on premises appliances. A HSM deployment can provide for Software as a Service (SaaS), Platform as a Service (PaaS), or Infrastructure as a Service (IaaS) models.

A "general purpose" (GP) HSM is a hardened, tamper-resistant hardware device that strengthens encryption practices by generating keys, encrypting and decrypting data, and creating and verifying digital signatures. GP HSMs may be assembled in clusters and act as a single hardware Root of Trust. It is a critical component of public key infrastructures (PKIs) to generate and protect root and certificate authority keys; code signing to ensure software remains secure, unaltered and authentic; and creating digital certificates for credentialing and authenticating proprietary electronic devices for Internet of Things (IoT) applications and other network deployments.

A "payment" HSM is a hardened, tamper-resistant hardware device that is used primarily by the retail finance or banking industry to provide high levels of protection for cryptographic keys and customer PINs used during the issuance of magnetic stripe and EMV chip cards (and their mobile application equivalents) and the subsequent processing of credit and debit card payment transactions. Payment HSMs normally provide native cryptographic support for all the major card payment applications and undergo rigorous independent hardware certification. Payment HSMs and management tools provide flexible, efficient transaction security for retail payment processing environments, internet payment applications, and web-based PIN delivery.

In described embodiments herein, there will be considered the non-limiting example of a turnkey solution to provide guaranteed levels of service to HSM resources, that requires 1) no changes to client applications and 2) no changes to HSM security certifications. With respect to point 1, in a networked HSM environment with millions of client seat installations, the solution herein is otherwise significantly more practical than fixing service level guarantees in each and every client. Moreover, with respect to point 2, in such an environment where HSM security certifications are mandatory and costly, the solution herein does not require any software or hardware changes within the scope of the security boundary, thereby lowering costs, schedules, complexity, and certification oversight.

FIG. 1 is a diagrammatic representation of a Hardware Security Module (HSM) Appliance 101 with in-place traffic controls for leveling HSM cryptographic services in accordance with one embodiment of the aforementioned turnkey solution. In this illustration, the HSM appliance 101 includes an HSM PCIe card 104 that inserts into a slot of the motherboard 102. The HSM PCIe card 104 is a certified tamper protected hardware security module having its own security scope and boundary, distinct from the rest of the HSM Appliance components. The HSM PCIe card 104 provides for hardware acceleration of cryptographic services requested by the motherboard 102. In other embodiments, the entire functionality and tamper protection features of the HSM PCIe card 104 may be fully integrated onto the motherboard as a monolithic design.

As illustrated in FIG. 1, the HSM appliance 101 provides cryptographic services to one or more clients 150. Each client 150 hosts one or more applications 156 that transmit requests 151 for cryptographic services to the HSM appliance 101. A cryptographic service request may be, but not limited to, data encryption/decryption, key generation/management, and/or PKI actions (signing, verification, etc.) among others. The HSM Appliance 101 processes the requests and provides a cryptographic service response 152 to the client 150 for each request 151 submitted. The cryptographic service requests 151 and responses 152 are communicated between the HSM appliance 101 and client 150 over a secure communication channel terminating on an Internet Protocol (IP) address and port of the HSM appliance 101. The transmission and reception of these requests 151 and responses 152 across the secure communication channel constitute the data traffic to be leveled.

The first type of secure communication channel between the HSM appliance 101 and client 150 is a Network Trust Link (NTL) 116 as shown in FIG. 1. NTLs are secure, authenticated network connections between the networked HSM appliance and clients. NTLs use two-way digital certificate authentication and TLS data encryption to protect sensitive data during all communications between the appliance and its clients. With NTLS, certificates are created on both the appliance and the client. These certificates are exchanged to register the appliance and client with each other. Once registered, the appliance will recognize the client and allow it access to the HSM. NTL encrypts data between the network interfaces of the appliance and client, but not between the network interface and the HSM within the appliance.

The second type of secure communication channel available between the HSM appliance 101 and client 150 is a Secure Trusted Channel (STC). Although not shown in FIG. 1, it uses secure key exchange and data encryption to protect sensitive data during communications between HSM partitions and clients. The HSM partition is segregated storage on the HSM PCIe card 104 that requires authentication to access cryptographic objects and data contained in this storage. The type of data encryption is user configurable; STC is flexible and customizable. STC supports a wide range of end-points, but its primary end-points are client applications connecting to the HSM 104 to access its cryptographic services and/or to perform HSM management functions. STC connects a client directly to a specific partition on the HSM in the appliance. The STC connection consists of two phases: tunnel establishment and message handling. During tunnel establishment, the end-parties perform bi-directional authentication and then establish unique session keys for each connection.

Briefly, the mother board 102 supports an Operating System (OS); a software component that executes on top of hardware, for example, a main processor thereon, to manage hardware resources and peripherals, run HSM jobs/processes, and help in execution of other cryptographic service processes. Ubuntu is one exemplary OS that provides an embedded Linux distribution with libraries and packages. Ubuntu (GNU/Linux) is a multitasking Operating System capable of executing several processes (tasks) simultaneously. Different processes for performing the HSM functions (data protection, key management, pin translations, etc.) are scheduled by the operating system. Linux is a family of open-source Unix-like operating systems based on the Linux kernel.

Linux Traffic Control (TC) is a feature built into the Linux kernel 114. Here, TC 112 is shown as a Linux utility to configure the packet scheduler for this data traffic. It can report a profile of network traffic by ranking it by link type, IP protocol, TCP/UDP port, IP address, or network address. Traffic Control (TC) 112 configures the kernel packet scheduler in the network stack of the NTL 116. It relies on queuing controls to govern data on transmission; for example, the requests 151 and responses 152. The term used herein for queue scheduling is queuing discipline (qdisc).

Traffic Control Agent (TCA) 106 is the interface between the administrator and the traffic control 112 under the Linux kernel 114. It effectively evaluates the traffic profiles 108 set by the administrators, or profiles that are updated automatically in intelligent mode, and sets the traffic parameters (e.g., bandwidth, rate, ceil, etc.) with TC 112. TCA 106 operates at the transaction level to provide real-time visibility and control the balance of HSM resources allocated to client requests, for example, with respect to the number of transactions per second for each client. The Traffic Control Agent (TCA) 106 effectively restricts traffic flow and throughput over time to balance client workloads on the HSM 104.

The TCA 106 is configurable by way of the administrative Applications Programming Interface (API) and secure shell 170. An API is a set of definitions and protocols to build and integrate application software. A User Interface (UI) implementing the API allows an administrator to set traffic control parameters mentioned above. Traffic Control executes within the firmware of the Linux OS in accordance with the set parameters.

The inventive aspects of the HSM Appliance 101 for traffic control is primarily by way of the components shown in the figure, but understandably, many more components, electronics, and modules are present in a typical HSM. Those components shown are those mostly related, and suitable for use, for implementing the foregoing inventive methods. Hardware (HW) components represent general electronics for operating the HSM (e.g., processors, central processing units, security, sensors, memory, network devices, ports, power supply units (PSU), wires, keylocks, etc.). The Hardware also contains memory to run operating system and input-output (I/O) devices for interaction. It comprises different types of processors, such as a crypto processor, security processor, general processing unit (GPU), central processing unit (CPU) to assist in protection, management of keys and hardware acceleration with the operating system.

Figure 2A:
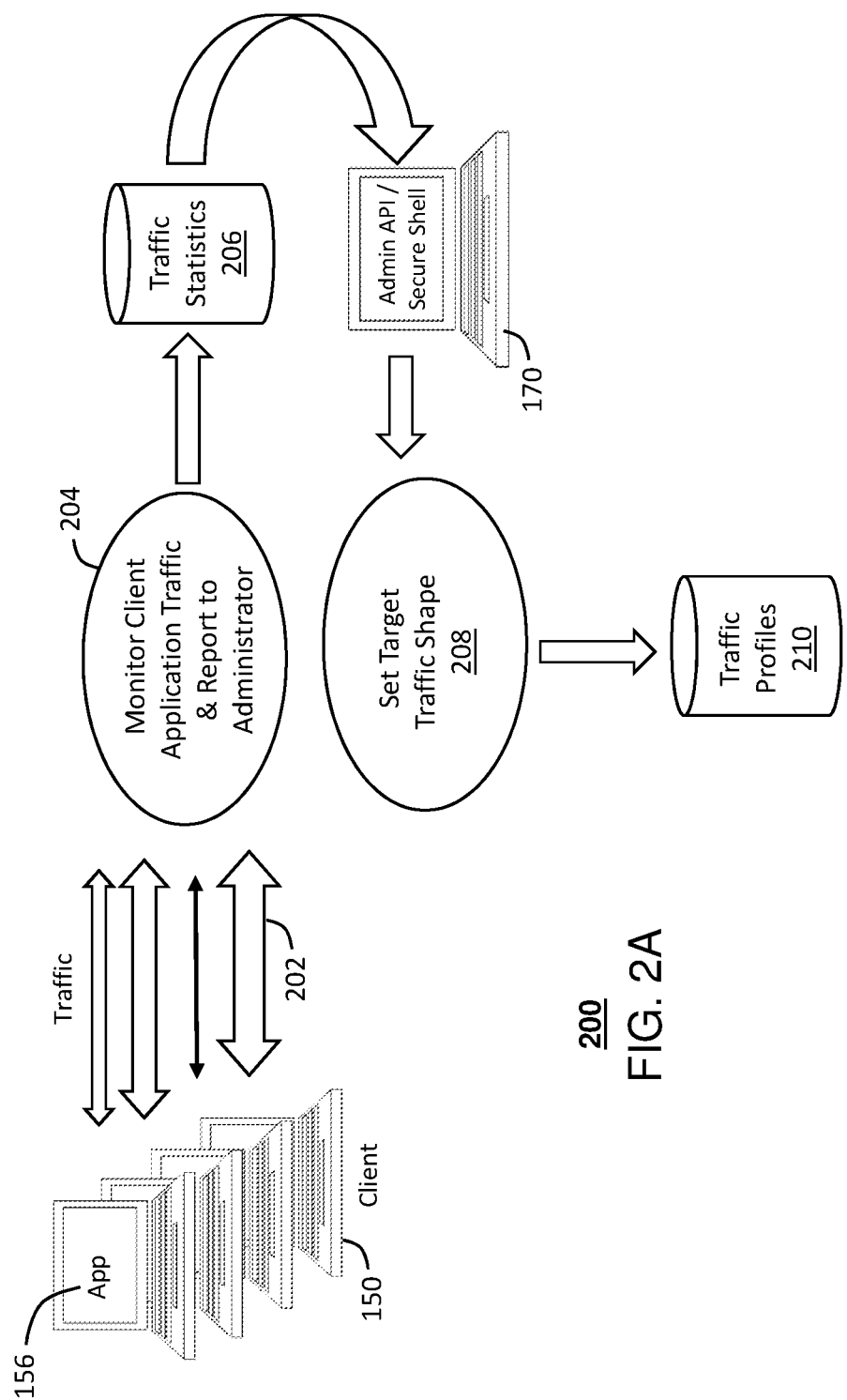
FIG. 2A illustrates a method and workflow for monitoring and setting traffic profiles of an HSM in accordance with an embodiment.

FIG. 2A illustrates a method and workflow 200 for monitoring and setting traffic profiles of the HSM Appliance in accordance with an embodiment. When describing the workflow 200, reference will also be made to the components of FIG. 1, where like numerals from that figure may be carried forward in describing the steps and actions shown. In this exemplary workflow 200, starting on the left side, the apps 156 on each client 150 create the cryptographic requests to which the HSM appliance 101 responds. These requests and responses constitute traffic. In this illustration, the arrow width of the traffic represents transactions per client. The wider the arrow, the larger the number of transaction requests and responses. The smaller the arrow, the fewer the number of transactions.

At step 204, traffic throughput metrics per client application are collected over unit time and reported to the administrator as metrics, for example, the number and type of transactions. Briefly referring back to FIG. 1, the Linux kernel traffic control 114 is one component providing this technical enablement. This step produces traffic statistics 206 which can be saved to a database. On the right side of the illustration, by way of the administrative API or secure shell 170, the administrator can then set a target traffic shape 208 in view of the traffic statistics. This is the mechanism by which the administrator can set the desired throughput profile per client application, which results in the traffic profiles 210. These traffic profiles specify the target, or desired, throughput of cryptographic traffic to each client.

Briefly, a subset of HSM capabilities have corresponding HSM policies that allow customers to customize the HSM configuration. The policies can be modified based on specific needs. The administrator can log into the HSM Appliance 101 to view the HSM capability and policy settings. The policies provide customers a simple way to apportion HSM appliance resources to clients, for instance, to balance and level traffic. Conversely, with no policies defined, all client applications go into a default policy. This default policy effectively leaves the HSM appliance resources available to whichever client makes a request: no controls. Customers create one or more policies that set a proportion of the available HSM appliance resources aside for each of the policies. A client cryptographic command line tool communicatively coupled to the HSM appliance is contemplated for setting such traffic profiles of the HSM appliance.

FIG. 2B shows an example command line tool "Multitoken" and output for four policies: 10%, 20%, 30%, and 40% HSM resource allocations. The top, three screen segments (261-263) are 10%, 20%, and 30%. Each policy has a single client application in it. Three clients are in the 40% policy. The bottom, three screen segments (271-273) show each of the three clients in the 40% policy. The numbers with arrow symbols show the average number of operations-per-second for each of the clients. Here, we see roughly 1000, 2000, and 3000 for the 10%, 20%, and 30% policies; and roughly 1333 for each of the 3 clients in the 40% policy.

The results shown in FIG. 2B are achieved by way of a user interface (see also Admin API/Secure Shell 170) that allows the administrator to set the traffic control "ceil" parameter. Through this interface the administrator measures achieved data traffic performance and tunes it up or down by setting a higher or lower value of the "ceil" parameter. Thereafter, as will be described ahead in further detail, the Traffic Control Agent (TCA) 106 (see FIG. 1) restricts traffic returned to clients in view of these settings (% of HSM allocated resources), and more specifically, to identified noisy clients. It tracks the number of transactions (e.g. cryptographic service requests) for each of the clients and shows where the traffic restriction is to be set, thereby more equitably apportioning HSM resources in view of data traffic (e.g., cryptographic service requests and responses) between the HSM appliance 101 and clients 150 (see FIG. 1). Such traffic data information may also be stored within a database for association with traffic profiles.

Referencing FIG. 3, while this administrative approach maximizes flexibility for the customer, it does place more responsibility and effort on the customer to achieve desired policies. Accordingly, additional functionality for a more intelligent Traffic Control Agent 106 is also contemplated and provided herein. Provided for this purpose is a traffic profile database 210 of cryptographic algorithms, key sizes, and mechanisms at hand, along with metrics for the different combinations. This provides the Traffic Control Agent 106 visibility into what requests the HSM appliance 101 receives (e.g. requests 151) and can therefore predict the resulting traffic for each request. With this information, the Traffic Control Agent 106 dynamically adjusts the ceil parameter to shape traffic to the customer's desired policy.

An even more intelligent traffic control agent is contemplated herein to learn from the requests it receives and build its own database of cryptographic algorithms, key sizes, and mechanisms and corresponding traffic for each combination. In this embodiment, the TCA creates a traffic profile responsive to collecting, reporting, and shaping, which provides an added dynamic intelligence aspect. The reporting may be an optional step once the TCA is automated with dynamic intelligence. It automatically interprets the traffic profile created to see what resources various cryptographic operations consume, for example, what is accessed, manipulated, or used in hardware and/or by software associated with the resource use. It then dynamically adjusts traffic in a feedback loop with less administrative involvement than typically required in the reporting step. That is, the administrator, after their initial involvement, allows the TCA to collect and shape the traffic dynamically without further oversight on their part. Nominal administrative involvement is less than that required of the administrator.

The term "sees" means the TCA at least identifies, detects, recognizes, or analyzes a use of said resources associated with said cryptographic operations in hardware and software. The resources may be hardware that is a memory, cache, general processor, cryptographic processor, PCIe card, or power unit. The resources may be associated with hardware processes such as threads, peripherals or jobs running on the hardware. The various crypto operations can be one among verification, signing, hashing, key generation, and PKI operations. In this configuration, the TCA employs the feedback loop to continually retrieve traffic statistics, update the traffic profile, and decide on a new ceiling as part of traffic adjustment for continuous resource leveling.

FIG. 3 illustrates a method and workflow 300 whereby the Traffic Control Agent (TCA) 106 shapes traffic to target profiles 210 of the HSM appliance 101 in accordance with one embodiment. When describing the workflow 300, reference is also be made to the components of FIG. 1, where like numerals from that figure may be carried forward in describing the steps and actions shown. In the center of the illustration is the Traffic Control Agent (TCA) 106 whose purpose is to restrict traffic returned from the HSM appliance 101 to the clients 150 in response to client requests, for example, including but not limited to "noisy" neighbor clients. The TCA 106 restricts the traffic to the clients in accordance with the traffic profiles 210, for example, set by the administrator, or per default settings as previously described.

As shown, the TCA 106 leverages Linux libraries, such as libcap, to implement user space interfaces for invoking Linux kernel capabilities, for example, Traffic Control (TC) 112 in the Linux kernel (see also FIG. 1 corresponding components). As mentioned in the description of FIG. 1, TCA 106 works in conjunction with the Linux kernel traffic control 114 to shape traffic (requests/responses) returned to client applications 156. Linux traffic control is a feature built into the Linux kernel. Linux Traffic Control 114 offers a number of qdisc algorithms. It was determined that stochastic fair queuing (SFQ) is an effective qdisc to solve the noisy neighbor, and affiliated, problems described in the background section above. Through this approach, internet protocol packets (arriving at the IP address and port from NTL 116; see FIG. 1) are filtered, and rules are applied to the traffic of these request/response packets. Only classful qdiscs support classification of traffic.

The classful qdisc algorithms that proved to work best is a Hierarchical Token Bucket (HTB), where rate means the guaranteed bandwidth available for a given class, and ceil is short for ceiling, which indicates the maximum bandwidth that class is allowed to consume. The bandwidth can be selected by first evaluating the data traffic bottleneck to each client and then choosing an available bandwidth needed. For the exemplary workflow 300, the TCA 106 applies HTB with SFQ to the client 150 configurations. With HTB, traffic is shaped by setting a maximum desired speed to which to limit the transmitted traffic. The ceiling parameter ("ceil") is selected as the HTB class parameter for this shaping purpose. By way of HTB, the Traffic Control Agent 106 dynamically changes the ceil parameter to shape traffic to the customer's desired policy. It can lower the "ceil" value to reduce responses to a client application, thereby reducing the volume of subsequent requests to the HSM appliance by that client application. And it can raise again the "ceil" value when traffic shaping gives too much priority to other client applications.

As seen in FIG. 3, the TCA 106 performs the workflow 300 in a continuous feedback manner that adjusts the ceiling parameter for selectively restricting traffic to certain clients while obtaining real-time traffic statistics from each client application. For instance, at step 310, the TCA 106 gets real-time traffic statistics for each client application, and in view of the traffic profiles 210, decides on a new ceiling as shown in step 312. The TCA 106 then adjusts the ceiling for one or more client application at step 314, and then enforces the ceiling by way of traffic control 112 in the Linux kernel. TCA 106 includes a closed feedback look to continually retrieve the traffic statistics at step 310, and decide on a new ceiling at step 312, as part of the continuous adjustment at step 314.

FIGS. 4A-4B and 5A-5B together pictorially illustrate the how the TCA 106 uses Linux traffic control over a window of time (e.g. a 6-second unit of time window) to balance and level (cryptographic transaction) workloads per client on the HSM appliance 101. In this illustration, only two clients (A and B) are considered, although in practice, many more clients and associated workload traffic are supported by the TCA 106. Also, in each figure, rightward arrows represent requests 151 (see also FIG. 1) from the client to the HSM, and leftward arrows represent responses 152 (see also FIG. 1) from the HSM back to the client. The TCA 106 is visually represented by a triangle teeter-totter symbol denoting how the traffic is balanced, here, by way of a Transaction Rate (TR) parameter implicitly related to the ceiling parameter, which indirectly moderates the HSM level of incoming requests 151 in view of an outgoing number of accumulated responses 152 over time.

For this example, assume there two clients: Client A and Client B. For illustrative purposes, assume that the administrator wants to track transactions per second, and the TCA 106 includes a one second delay (i.e., since each FIGS. 4A-4C and 5A-5C represents a 1 second time interval) as time resolution for the Transaction Rate (TR) parameter. The time resolution specifies the minimum time when the TR parameter may be updated. Here the TR parameter is fixed over the 6 second window, but may also be adaptive over variable time windows in other embodiments.

Figure 5A:
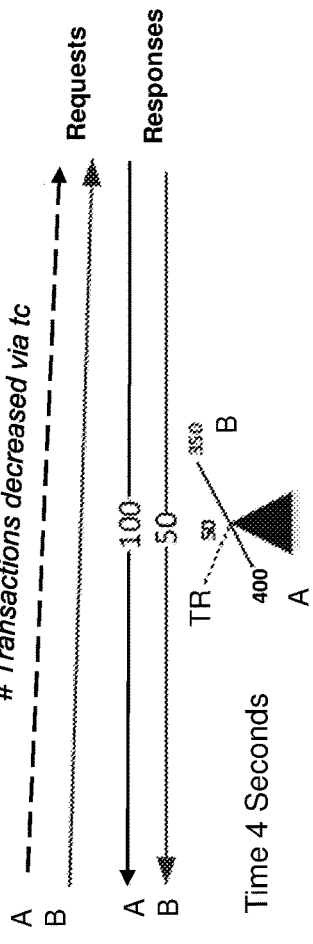
FIGS. 5A, 5B & 5C illustrate exemplary 4, 5, and 6 second time periods for HSM resource balancing via traffic control in accordance with one embodiment.
Figure 5B:
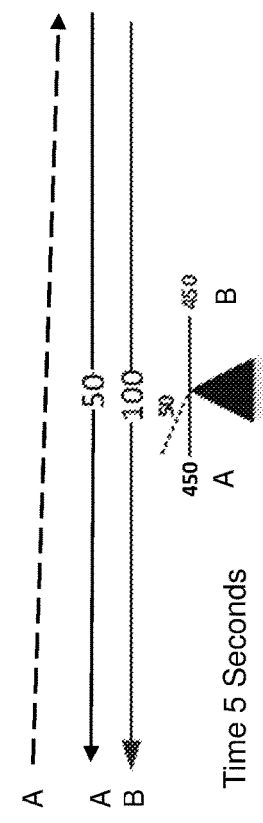
Figure 5C:
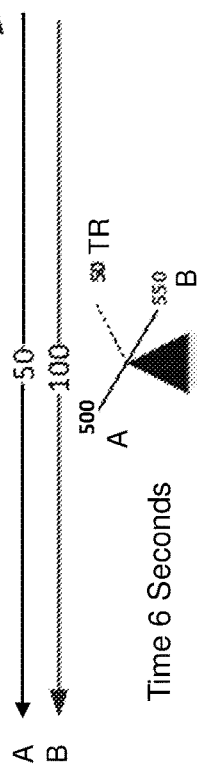

Briefly, with no traffic control yet in effect (since TR has not been set in FIG. 4A), Client A is seen to receive half the number of transaction responses (1×100) per second from the HSM as Client B (2×100). Conversely stated, Client B receives twice the number of transaction responses 152 as that of Client A. Here, FIG. 4A shows the initial unbalanced traffic after 1 second (100 responses to Client A vs 200 Client B). In view of this imbalance, the traffic control agent (TCA) 106 (shown as the triangle teeter-totter symbol) by way of the TR parameter will need to restrict traffic returned to noisy client B over time. The TCA 106 tracks the number of transactions for each of the clients and establishes where the traffic restriction (TR) is to be set (i.e., TR is the dotted line that will be set to an initial arbitrary number). It is responsible for equitable apportioning of the HSM resources, and sets the TR in this example, so that the traffic returned to Client 2 is restricted to 50 transactions per second. At the end of the $1^{st}$ second, the TCA teeter-totter shows Client A has accumulated 100 responses, and Client B has accumulated 200 responses, with respect to their total requests over the $1^{st}$ second FIG. 4B shows the resulting traffic to each client after 2 seconds after TR is set to 50. Here, Client B has still requested (right arrows) twice the number of operations per second as Client A but gets back responses (left arrows) for one quarter (i.e., 50) that amount. The TCA continues to restrict traffic to Client 2. At the end of the $2^{nd}$ second, the TCA teeter-totter shows Client A has accumulated 200 responses, and Client B has accumulated 250 responses, with respect to their total requests over the 2 seconds. FIG. 4C shows the resulting traffic to each client after 3 seconds (with TR=50). With the reduced bandwidth, Client B only gets responses to requests issued previously and is unable to issue new requests (no more right arrows from Client B). However, Client A continues to issue requests (1 right arrow) and get responses. This is due to the TCA 106 leveraging stochastic fair queuing (STF) and HTB, wherein lowering the ceil value reduces responses to a client application, thereby reducing volume of subsequent requests to HSM to the client application. This results in a balancing of the traffic to the two clients. That is, traffic to the two clients is now balanced over the elapsed interval. At the end of the 3rd second, the TCA teeter-totter shows Client A has accumulated 300 responses, and Client B has accumulated 300 responses, with respect to their total requests over the 3 seconds FIGS. 5A-5B illustrate exemplary 4, 5, and 6 second time periods for HSM resource balancing via traffic control in accordance with one embodiment. FIG. 5A, shows the tipping point of the TCA teeter-totter in favor of Client A, which now creates an imbalance against Client B. During this time interval, TCA has restricted traffic returned to Client B sufficiently long enough that Client A is getting back more responses than Client B. At the end of the 4th second, the TCA teeter-totter shows Client A has accumulated 400 responses, and Client B has accumulated 350 responses, with respect to their total requests over the 4 seconds. Accordingly, TCA switches the restriction in throughput from Client B to Client A. FIG. 5B, illustrates the affect that TCA's reduction in responses has imparted on Client A. Client B is now able to get twice the number of transactions per second and restore the balance. TCA continues to restrict throughput to Client A: namely, TCA only restricts throughput when it detects an imbalance; that is, when the request to responses are unbalanced. At the end of the 5th second, the TCA teeter-totter shows Client A has accumulated 450 responses, and Client B has accumulated 450 responses, with respect to their total requests over the 3 seconds. A second later (in the 6th second interval), as seen in FIG. 5C, the imbalance tips again in favor of Client B. The TCA switches the traffic reduction to Client B. The TCA continues this teeter-totter adaption in the manner described as time progresses.

Figures 6A, 6B:
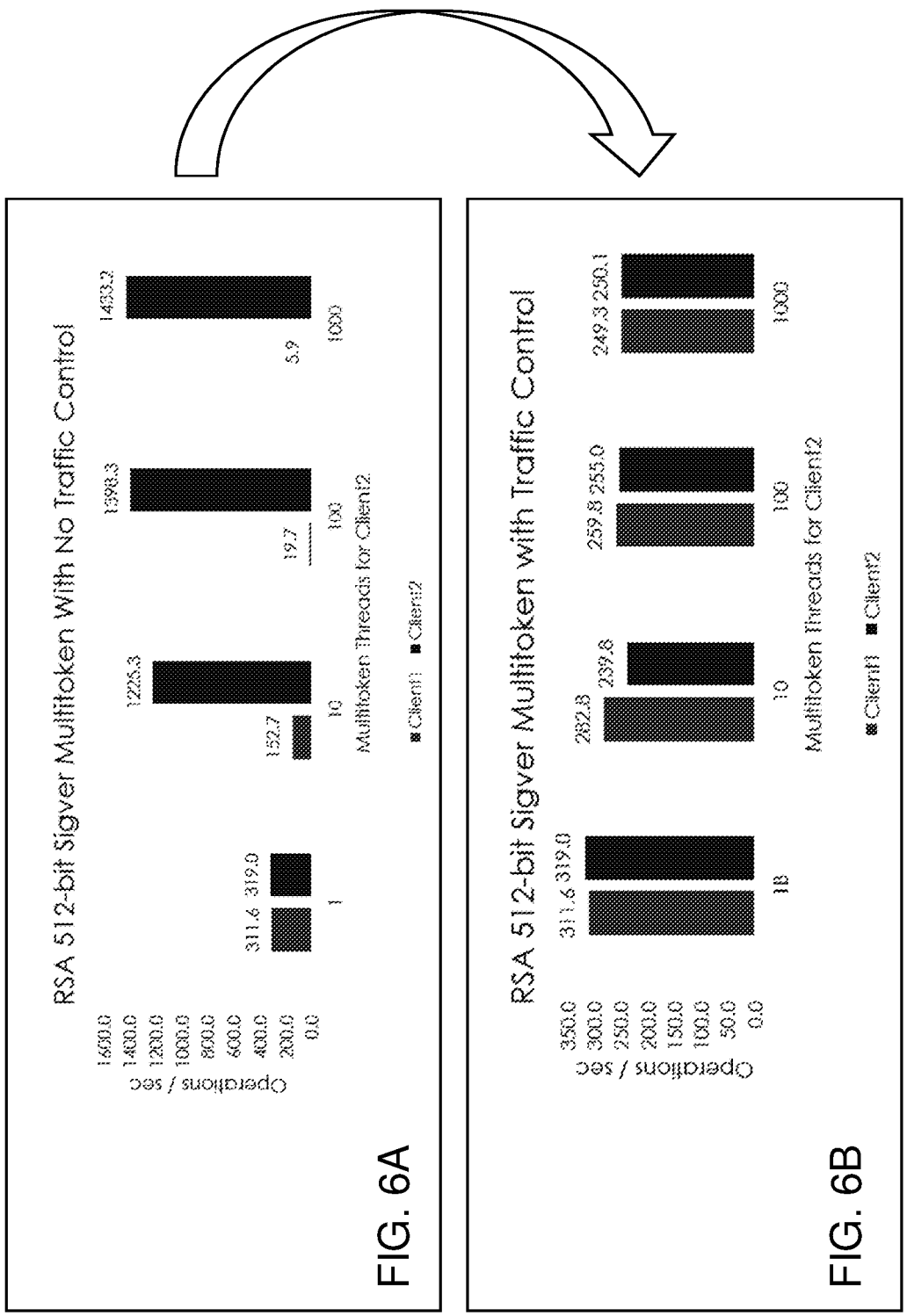
FIG. 6A shows an exemplary table of throughput rates on an HSM for client cryptographic tool operations without in-place traffic controls in accordance with one embodiment.
FIG. 6B shows an exemplary table of throughput rates on an HSM for client cryptographic tool operations with in-place traffic controls in accordance with one embodiment.

FIG. 6A shows an exemplary table of throughput rates on an HSM for a cryptographic client represented as "multi-token operations" without traffic control in accordance with one embodiment. It shows a graph of two clients with differing demands on the HSM appliance with no traffic control in place. In this example, an RSA 512-bit signature verification is performed whereby the TCA 106 does not apply any traffic control to either client configurations. As seen by the graphs, the number of operations per second to each client is unbalanced; namely, the transactions are for two clients with similar traffic but with multiple orders of magnitude difference in the traffic.

Each client runs a single thread in the application and each client is getting approximately the same number of operations per second. In the second, third, and fourth pairs of bars, the first client continues to run a single thread but the second client runs 10, 100, and 1000 threads respectively. We see the number of operations for the first client fall off and the number of operations for the second client increase. The differential in operations per second is "roughly" equal to the order of magnitude of the thread count for the second client. As a percentage ratio, the differential for the unbalanced tests is 702%, 6,998%, and 24,192%. Client1:Client2 at the higher 1:1000 thread ratio leaves client 2 with 1000 times more HSM resources than client 1. The imbalance is proportional to traffic sent to HSM appliance 101.

FIG. 6B shows an exemplary table of throughput rates on an HSM for multi-token operations with in-place traffic controls in accordance with one embodiment. The same RSA 512-bit signature verification is considered whereby the TCA 106 (see FIG. 1) has applied HTB with SFQ to the client configurations. The first pair of bars in the graph is the one-to-one thread baseline of FIG. 6A. Whereas, FIG. 6B shows traffic control creating near single-digit balance in the HSM operations per second for the two clients, with client1-to-client2 ratio for 10, 100, and 1000 thread differential is 15%, 2%, and 0% respectively. Here, with traffic control, HSM appliance 101 resources allocated to the threads are balanced between the client workloads, rather than the number of assigned threads (or thread ratio between the clients). The HSM Appliance by way of TCA 106 distributes a fair, proportional share of resources on the HSM appliance needed for servicing the cryptographic services to multiple clients irrespective of thread count per client.

Figure 7:
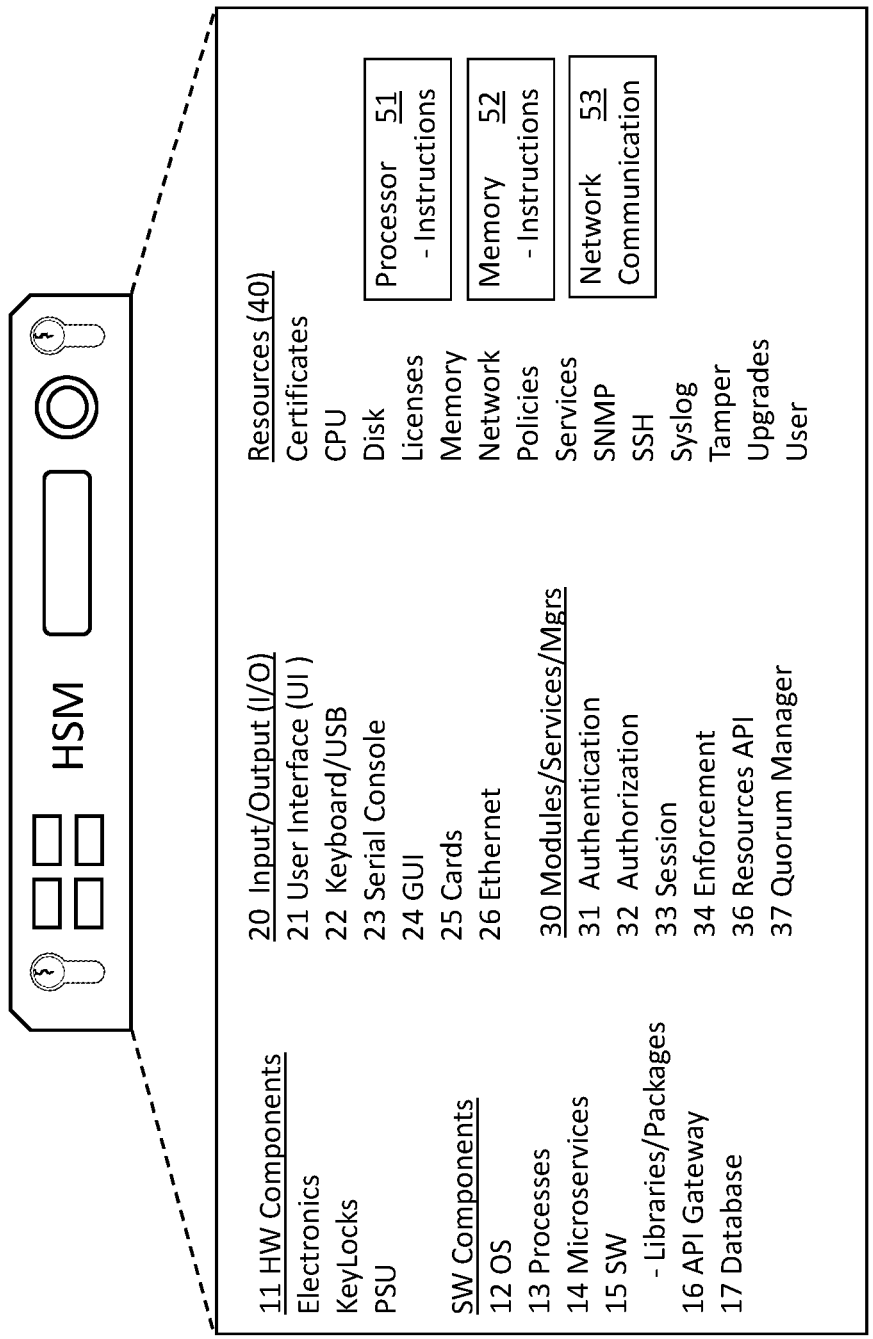
FIG. 7 depicts exemplary components of a Hardware Security Module (HSM) in accordance with one embodiment.

FIG. 7 depicts exemplary components of the Hardware Security Module (HSM) 700 in accordance with one embodiment. The HSM 700 (see also 101 in FIG. 1) is a physical computing device that, among other capabilities, safeguards and manages digital keys, performs encryption and decryption functions for digital signatures, and provides for strong authentication and other cryptographic functions. As a security hardened unit, the HSM 101 records tamper evidence, such as visible signs of tampering or logging and alerting, and provides for tamper responsiveness such as deleting keys upon tamper detection. The HSM 101 contains one or more secure crypto-processors and sensor chips to prevent tampering and bus probing, or a combination of chips in a module that is protected by the tamper evident, tamper resistant, or tamper responsive packaging.

The HSM 700 is in effect a computer system comprising one or more processors 51 and memory 52 coupled to the one or more processors, wherein the memory 52 includes computer instructions which when executed by the one or more processors causes the one or more processors to perform the operations of the methods described herein. The HSM may be connected over the network to other machines via the network communication device interface 53. The HSM may be installed in the backplane of a server. The HSM may be connected via an interface (e.g. universal serial bus) to a server. In a networked deployment, the machine may operate in the capacity of a server or a client user machine in server-client user network environment, or as a peer machine in a peer-to-peer, or distributed, network environment.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the machine-readable memory 52 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

Operational use of the HSM 700 for establishing an End to End (E2E) trusted HSM setup using the methods described above is primarily by way of the components shown in the figures, but understandably, many more components, electronics, and modules are present in a typical HSM. Those components shown are those mostly related, and suitable for use, for implementing the foregoing inventive methods. Hardware (HW) components 11 represent general electronics for operating the HSM (e.g., processors, central processing units, security, sensors, memory, network devices, ports, power supply units (PSU), wires, keylocks, etc.). The Hardware also contains memory to run operating system and input-output (I/O) devices for interaction. It comprises different types of processors, such as a crypto processor, security processor, general processing unit (GPU), central processing unit (CPU) to assist in protection, management of keys and hardware acceleration with the operating system. The keys, or any other data, can be stored in the database for persistence. The hardware architecture is designed to protect and manage digital keys, and can perform encryption, decryption, digital signature generation and verification.

The Operating System (OS) 12 is a software component that executes on top of hardware, for example, the general processor, to manage hardware resources and peripherals, run HSM jobs/processes, and help in execution of other processes 13. Ubuntu is an exemplary OS that provides an embedded Linux distribution with libraries and packages. Ubuntu (GNU/Linux) is a multitasking Operating System capable of executing several processes (tasks) simultaneously. Different processes 13 for performing the HSM functions (data protection, key management, pin translations, etc.) are scheduled by the operating system 12. A thread is the basic unit to which the operating system allocates processor time. A process 13 is an instance of a computer program that is executed by one or many threads in the GPU or CPU. One or more threads run in the context of the process. A thread can execute any part of the process code, including parts currently being executed by another thread.

In another embodiment, an API 16 is provided for End to End (E2E) trusted HSM setup when configured as a microservice. The API can be a RESTful API using HTTP requests to produce and consume data related to network configuration services via at least one of a GET, PUT, POST, PATCH and DELETE command type. The API includes a command set for each stage of warranting, commissioning, and provisioning the HSM during initial set-up and for life-cycle HSM management, including but not limited to certificate management at each stage.

The Application Programming Interface (API) 16 provides a connection between computers or between computer programs/applications, and/or between computers and people. It is a type of software interface, offering a service to other pieces of software. The API provides a communication channel between HSM components, internal processes 13 and/or micro services 14. These APIs are exposed on top of input/output (I/O) 20 interfaces. External systems and/or people communicate with HSM via the I/O interfaces 20, such as a basic user interface (UI) 21, or more sophisticated graphical user interface (GUI) 24 The HSM can also communicate with external systems through hardware IO interfaces, such as the keyboard 22, serial port 23, smart card 25, Ethernet 26, optical ports, USB ports, etc. External systems (host computers in a data center) can also talk to HSM software interface via APIs exposed on top of individual hardware interfaces (e.g., network device driver, disk/memory management, etc.).

The HSM includes a local console 23 that is serial connected over e.g., a USB-C interface. The serial interface can be used by operations personnel, namely operators, referred to as DCOps (standing for Data Center Operations), who have physical access to the HSM for manually issuing commands to the HSM. Such USB-C interface is used, for all configuration throughout the HSM service, including initial configuration and cumbersome provisioning processes. The HSM also includes managerial Graphical User Interface (GUI) 24 that over an Ethernet 26 connection allow for remote configuration of the HSM. Also, the I/O 20 can be used to configure network settings, TLS certificates, upgrades, licenses and devices (e.g. CPU, Disk, memory, etc.). Operator (Java) cards 25 also provide a means for provisioning and securing the HSM using key shares and key splits.

The HSM also includes services 30 by way of modules, processes and service managers. Some services may be internal to the HSM, and others may be selectively exposed via an API gateway 16 to external entities or services. Examples of services 30 include authentication 31, authorization 32, session manager 33, enforcement 34, resource API manager 36, and quorum manager 37. Accordingly, service managers can be invoked/managed/configured remotely (external) via their APIs, for example, from a web based GUI via Internet connection over Ethernet to the HSM.

The HSM also includes (internal) resources 40 which can be externally configured via the normal I/O interfaces 20, and also, for some, (internally and externally) via any of the module/service managers 30 and their respective APIs. Examples of HSM resources include, but are not limited to, certificates, licenses, policies, device management, services, upgrades and so on. Each resource 40 has a respective API for software modules, processes or microservices to interact with the respective resource. The HSM offers access and services to each resource 40 via the resources API 36. Aside from payment HSM related tasks (e.g. encryption/decryption, key management, etc.), this includes: certificate/license management, SNMP, TLS, memory management/configuration, network management/configuration, upgrade installations/services, user resources, and so on.

The architectural style for APIs is typically categorized as either being SOAP (former acronym for "Simple Object Access Protocol", but referring now to a "Service Oriented Architecture", SOA for Web services) or REST (Representational State Transfer), and both are used to access Web services. While SOAP relies solely on XML to provide messaging services, REST offers a more lightweight method, using URLs in most cases to receive or send information. REST uses different HTTP 1.1 verbs, also known as access "methods" to perform tasks. These methods are GET, POST, PUT, and DELETE, which refers to the reading, updating, creating and deleting of operations concerning objects or resources, respectively. Unlike SOAP, REST does not have to use XML to provide the response. Some REST-based Web services output the data in Command Separated Value (CSV), JavaScript Object Notation (JSON) and Really Simple Syndication (RSS). The advantage with REST is that the output needed can be obtained in a form that is easy to parse within the language of the application specifically concerned.

In the embodiments presented herein, REST offers an alternative to, for instance, SOAP as method of access to a web service. In order to be used in a REST-based application, a web service needs to meet certain constraints. Such a web service is called RESTful. A RESTful web service is required to provide an application access to its web resources in a textual representation and support reading and modification of them with a stateless protocol and a predefined set of operations. By being RESTful, web services provide interoperability between the computer systems on the internet that provide these services. RESTful APIs embody the rules, routines, commands, and protocols that integrate the individual microservices, so they function as a single application. In a RESTful web service, requests made to a resource's URL will elicit a response with a payload formatted in HTML, XML, JSON, or some other format. The response can confirm that some alteration has been made to the resource state, and the response can provide hypertext links to other related resources. When HTTP is used, the operations (HTTP methods) available can comprise: GET, POST, PUT, DELETE, PATCH, and/or OPTIONS.

The HSM can also expose an API that defines commonly used cryptographic object types and all the functions needed to use, create, generate, modify and delete those objects. Object types include for example EC keys, RSA keys, X.509 certificates, DES/Triple DES keys, etc. The interface to the HSM may also implement PKCS #11 as one of the Public-Key Cryptography Standards. By way of the API, the HSM can create and manipulate cryptographic tokens, such as a secret, like a cryptographic key. Clients or developers may use the API to generate, create or modify public-private key pairs and associated uses thereof.

In the embodiments presented herein, a general purpose Remote Procedure Call (gRPC) offers an alternative model to API design for access to a web service. In order to be used in a gRPC-based application, a web service needs to meet certain constraints. gRPC is a technology for implementing RPC APIs that uses HTTP 2.0 as its underlying transport protocol, but HTTP is not exposed to the API designer. gRPC is a robust open-source RPC framework used to build scalable and fast APIs. It allows the client and server applications to communicate transparently and develop connected systems. gRPC services and messages between clients and servers are defined in proto files. The Protobuf compiler, protoc, generates client and server code that loads the .proto file into the memory at runtime and uses the in-memory schema to serialize/deserialize the binary message. After code generation, each message is exchanged between the client and remote service. gRPC offers faster performance and API-security than REST+JSON communication as it uses Protobuf and HTTP/2.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments.

What is claimed, is:

1. A Hardware Security Module (HSM) appliance providing cryptographic services to multiple clients via cryptographic service requests and responses transmitted over a secure communication channel there between,
    wherein the HSM appliance comprises:
        a Linux Kernel providing a traffic control feature for communications over said secure communication channel; and
        a Traffic Control Agent (TCA) communicatively coupled to the Linux Kernel to level cryptographic service and balance a workload of cryptographic transactions on the HSM appliance for the multiple clients submitting said requests and receiving said responses,
            thereby distributing a fair, proportional share or an administratively-defined share of resources on the HSM appliance needed for servicing the cryptographic services to multiple clients irrespective of cryptographic service request count per client.

2. The HSM appliance of claim 1, wherein the TCA
    collects traffic throughput metrics per client application over unit time related to the cryptographic services;
    reports said throughput metrics to an administrator by way of an administrative shell or REST interface used to set a desired throughput profile per client application; and
    shapes traffic returned to client applications responsive to the desired throughput profile set by an administrator.

3. The HSM appliance of claim 2, wherein the TCA shapes said traffic by way of traffic control that:
    filters internet protocol packets arriving at an IP address and port associated with the secure communication channel;
    configures a kernel packet scheduler in a network stack managed by the Linux Kernel associated with traffic over the secure communication channel; and
    applies rules to said traffic on the secure communication channel associated with the cryptographic service requests and responses based on Stochastic Fair Queuing (SFQ) and Hierarchical Token Buckets (HTB) of said traffic control feature.

4. The HSM appliance of claim 3, wherein the traffic control agent (TCA) leverages stochastic fair queuing (STF) and Hierarchical Token Bucket (HTB) of the traffic control feature,
wherein lowering a ceil value of the ceiling parameter reduces responses to client application, thereby reducing volume of subsequent requests to HSM appliance to the client application.

5. The HSM appliance of claim 1, wherein said secure communication channel is one of
a Network Trust Link (NTL) providing secure, authenticated network connections between the HSM appliance and said multiple clients, and
a Secure Trusted Channel (STC) using secure key exchange and data encryption to protect sensitive data during communications between HSM partitions of the HSM Appliance and said multiple clients.

6. The HSM appliance of claim 2, further comprising creating a traffic profile responsive to said collecting, reporting, and shaping thereby providing dynamic intelligence to the TCA,
whereby the TCA further automatically interprets said traffic profile to see what resources various cryptographic operations consume and dynamically adjusts traffic in a feedback loop with nominal administrative involvement,
wherein said sees means the TCA at least identifies, detects, recognizes, or analyzes a use of said resources associated with said cryptographic operations in hardware and software;
wherein said resources are hardware that is a memory, cache, general processor, cryptographic processor, PCIe card, or power unit and and hardware processes that is one among threads, peripherals or jobs;
wherein said various crypto operations are one among verification, signing, hashing, key generation, and PKI operations; and
wherein TCA employs said feedback loop to continually retrieve traffic statistics, update the traffic profile, and decide on a new ceiling as part of traffic adjustment for continuous resource leveling.

7. The HSM appliance of claim 1, further comprising a HSM PCIe card that is a certified tamper protected hardware security module having its own security scope and boundary, distinct from other components of the HSM Appliance, and providing hardware acceleration of said cryptographic transactions.

8. The HSM appliance of claim 1, wherein the TCA specifically restricts traffic returned to identified demanding clients that request more cryptographic transactions over a time interval than a determined threshold with respect to other clients.

9. The HSM appliance of claim 8, wherein the TCA tracks a number of cryptographic transactions for each of the multiple clients and establishes where a Traffic Restriction (TR) is set for equitable apportioning of HSM resources for servicing the requests.

10. The HSM appliance of claim 9, wherein by way of the Traffic Restriction (TR), the identified demanding clients only get responses to requests issued previously and are unable to issue new requests thereby reducing bandwidth to the HSM and cryptographic service workload thereon.

11. The HSM appliance of claim 8, wherein the TCA adjusts a ceiling parameter in a continuous feedback manner that selectively restricts traffic to identified demanding clients while obtaining real-time traffic statistics from said multiple clients.

12. A method for a Hardware Security Module (HSM) appliance to provide cryptographic services to multiple clients (150) via cryptographic service requests and responses transmitted over a secure communication channel there between,
wherein the method comprises the steps of:
providing a traffic control feature for communications over said secure communication channel by way of a Linux Kernel; and
leveling cryptographic service and balancing a workload of cryptographic transactions on the HSM appliance for the multiple clients submitting said requests and receiving said responses by way of a Traffic Control Agent (TCA),
thereby distributing a fair, proportional share of resources on the HSM appliance needed for servicing the cryptographic services to multiple clients irrespective of cryptographic service request count per client.

13. The method of claim 12, further comprising:
collecting traffic throughput metrics per client application over unit time related to the cryptographic services;
reporting said metrics to an administrator by way of an administrative shell or REST interface used to set a desired throughput profile per client application; and
shaping traffic returned to client applications responsive to the desired throughput profile set by an administrator.

14. The method of claim 13, further comprising:
filtering internet protocol packets arriving at an IP address and port associated with the secure communication channel;
configuring a kernel packet scheduler in a network stack managed by the Linux Kernel associated with traffic over the secure communication channel; and
applying rules to said traffic on the secure communication channel associated with the cryptographic service requests and responses based on Stochastic Fair Queuing (SFQ) and Hierarchical Token Buckets (HTB) of said traffic control feature.

15. The method of claim 14, further comprising:
lowering a ceil value of the ceiling parameter to reduce responses to client application, thereby reducing volume of subsequent requests to HSM appliance to the client application.

16. The method of claim 15, wherein the step of shaping traffic is by way of the rules, and includes lowering said ceil value to restrict traffic returned to identified demanding clients that request more cryptographic transactions over a time interval than a determined threshold with respect to other clients.

17. The method of claim 15, wherein the step of shaping traffic is by way of the rules, and includes tracking a number of cryptographic transactions for each of the multiple clients and establishing a Traffic Restriction (TR) for equitable apportioning of HSM resources for servicing the requests.

18. The method of claim 15, wherein the identified demanding clients only get responses to requests issued previously and are unable to issue new requests thereby reducing bandwidth to the HSM and cryptographic service workload thereon.

19. The method of claim 15, further comprising adjusting a ceiling parameter in a continuous feedback manner to selectively restrict traffic to said identified demanding clients while obtaining real-time traffic statistics from said multiple clients.

20. The method of claim 12 further comprising:
creating a traffic profile responsive to said collecting, reporting, and shaping thereby providing dynamic intelligence to the TCA,
whereby the TCA further automatically interprets said traffic profile to see what resources various cryptographic operations consume and dynamically adjusts traffic in a feedback loop with nominal administrative involvement,
wherein said sees means the TCA at least identifies, detects, recognizes, or analyzes a use of said resources associated with said cryptographic operations in hardware and software;
wherein said resources are hardware that is a memory, cache, general processor, cryptographic processor, PCIe card, or power unit and and hardware processes that is one among threads, peripherals or jobs;
wherein said various crypto operations are one among verification, signing, hashing, key generation, and PKI operations; and
wherein TCA employs said feedback loop to continually retrieve traffic statistics, update the traffic profile, and decide on a new ceiling as part of traffic adjustment for continuous resource leveling.

\* \* \* \* \*